United States Patent
LeComte et al.

(10) Patent No.: US 7,639,833 B2
(45) Date of Patent: Dec. 29, 2009

(54) PERSONALIZED MARKUP FOR PROTECTING NUMERICAL AUDIOVISUAL STREAMS

(76) Inventors: Daniel LeComte, 157 rue de la Pompe, F-75116 Paris (FR); Daniela Parayre-Mitzova, 88 rue Philippe de Girard Bat. B, Appt 132, F-75018, Paris (FR); Sebastien Georges, 21 rue des Boulangers, F-75005 Paris (FR)

(*) Notice: Subject to any disclaimer, the term of this patent is extended or adjusted under 35 U.S.C. 154(b) by 427 days.

(21) Appl. No.: 11/165,150

(22) Filed: Jun. 23, 2005

(65) Prior Publication Data

US 2005/0289064 A1    Dec. 29, 2005

Related U.S. Application Data

(63) Continuation of application No. PCT/FR03/050193, filed on Dec. 19, 2003.

(30) Foreign Application Priority Data

Dec. 31, 2002   (FR) .................................. 02 16918

(51) Int. Cl.
*G06K 9/00* (2006.01)
*H04N 7/167* (2006.01)
*G06F 7/04* (2006.01)
*G06F 17/30* (2006.01)
*H04N 7/16* (2006.01)

(52) U.S. Cl. ................ 382/100; 380/200; 380/201; 380/210; 726/26

(58) Field of Classification Search ................. 382/100, 382/128; 705/51; 380/210, 282, 51, 54, 380/200, 201; 726/26
See application file for complete search history.

(56) References Cited

U.S. PATENT DOCUMENTS

| 4,528,588 | A  | * | 7/1985 | Lofberg ..................... 340/5.1 |
| 5,960,081 | A  | * | 9/1999 | Vynne et al. ................ 713/176 |
| 6,285,774 | B1 | * | 9/2001 | Schumann et al. .......... 382/100 |
| 6,414,725 | B1 | * | 7/2002 | Clarin et al. ................ 348/714 |
| 2002/0076082 | A1 | * | 6/2002 | Arimura et al. ............. 382/100 |
| 2002/0126201 | A1 | * | 9/2002 | Schmitt et al. ........... 348/14.09 |
| 2002/0129253 | A1 |   | 9/2002 | Langelaar |
| 2003/0051252 | A1 | * | 3/2003 | Miyaoku et al. ............ 725/109 |
| 2003/0123659 | A1 | * | 7/2003 | Forstrom et al. ............ 380/205 |
| 2004/0114764 | A1 | * | 6/2004 | Dauvois et al. ............. 380/277 |

FOREIGN PATENT DOCUMENTS

| EP | 107567 A1 |   | 5/1984 |
| EP | 1187478 A2 |   | 3/2002 |
| JP | 08-241403 | * | 9/1996 |
| WO | 97/46012 |   | 12/1997 |
| WO | WO 97/46012 |   | 12/1997 |

* cited by examiner

*Primary Examiner*—John B Strege
(74) *Attorney, Agent, or Firm*—Connolly Bove Lodge & Hutz LLP

(57) ABSTRACT

A process for distributing a video stream to a multitude of destinations including marking by adding to the video stream at least a visual element such that the marking is applied to an original video stream common to selected recipients, and personalized for a least portion of the recipients by addition of a visual element specific to destination equipment.

21 Claims, 3 Drawing Sheets

PERSONALIZED MARKUP FOR PROTECTING NUMERICAL AUDIOVISUAL STREAMS

RELATED APPLICATION

This is a continuation of International Application No. PCT/FR2003/050193, with an international filing date of Dec. 19, 2003 (WO 2004/062281, published Jul. 22, 2004), which is based on French Patent Application No. 02/16918, filed Dec. 31, 2002.

TECHNICAL FIELD

This disclosure relates to a device capable of transmitting in a secured manner a collection of numerical images of high visual quality to a display and/or for storing in the memory of a back-up device that connects a transmission network to the display while preserving the visual quality, but avoiding fraudulent use such as the possibility of making unauthorized copies of the films or audiovisual programs.

BACKGROUND

A general problem in the art is to provide a procedure capable of transmitting in a secured manner audiovisual and multimedia data of high visual quality and in whatever numerical format, live or prerecorded, to a television screen, video projector or for being recorded on a hard disk or a completely different back-up device belonging to a box that connects the remote transmission network to a display of a type of monitor, television screen, video projector, or projection screen, all while preserving the audiovisual quality, but avoiding fraudulent utilization such as the possibility of making pirated copies, analog or numerical, of the films or audiovisual programs visualized via the aforementioned decoder box.

The demand for interactive multimedia services is more and more important. The distribution systems of multimedia information on DVDs or on the telecommunication network, for example, video on demand systems are in full expansion and characterized by their complexity and their insecurity with respect to pirating in spite of numerous existing procedures and systems. These distribution systems are often very expensive to implement by the user, lack security, flexible usage, and the adaptability to different clients and their needs. Moreover, they are often pirated by mal-intentioned persons in spite of the various protection or traceability procedures, such as "watermarking." "Watermarking," also called digital watermarking, is a technique that joins the visual or audio content, the digital content such as images, the video or audio streams. The technique consists of processing the contents to insert information in the contents. In general, the inserted information is invisible at the time of seeing the content, but can be retrieved by applying the processing of the aforementioned content. Two types of watermarks exist:

the fragile watermark: The inserted information is affected by a modification of the content; this type of watermark is used to detect if the contents have been modified;

the robust watermark: The inserted information is itself conserved even if the content is modified; this type of watermark is, for example, used to associate the royalties of an author with a work.

Certain holders of films or audiovisual programs make fraudulent copies which they then distribute via various supports (Internet, DVDs pirates). Indeed, the majority of current protection systems rely solely on protection through encrypting a digital stream. However, once decoded on the client station, the film is no longer protected and can be copied on other supports such as a simple VHS cassette, for example, with a video tape recorder connected between the video output of the decoder and the television set.

Different watermarking solutions exist that withstand the various manipulations that the aforementioned fraudulent copy can undergo to correct this problem. However, it does not permit the immediate identification of the person at the origin of the copy and, thus, the fraudulent broadcast. Copying and distribution of the pirated audiovisual programs continues without an immediate and simple visual identification of the coordinates of the persons at the origin of the fraud.

With existing solutions, it is possible to transmit films and audiovisual programs in digital form via broadcasting networks of type wireless, cable, satellite, etc., or via the telecommunication networks of type DSL or (Digital Subscriber Line) or LLR. (Local Loop Radio) or via DAB (Digital Audio Broadcasting), etc., networks. In addition, to avoid the pirating of works broadcasted in this way, the latter are often encrypted or scrambled through various well known means.

However, a main inconvenience of current solutions is that in the case of pirating of the protection system, particularly by systems of falsified chip cards or by the simulation of the encryption keys, the audiovisual works are susceptible to being broadcasted in an uncontrolled way in a perfect digital form, that is, in every respect in conformity with the original. Moreover, a single pirated copy of such an audiovisual program can enable the pirate, who is at the origin, to commercialize on a large scale the pirated work because it is perfect.

One solution consists of digitally marking the distributed digital copies. For example, US 2002/129253 discloses a procedure for processing a compressed MPEG stream that consists of directly marking the compressed MPEG signal by the modification of the values present in the stream according to a watermarking motif. However, that type of procedure does not guarantee that the mal-intentioned user could not create a copy of the protected film in another form that is different from the form in which it was supplied. In particular, those procedures do not guarantee the impossibility of producing copies of the films in the form of VHS cassettes that allow commercialization of the illicit copies. In the same way, they do not prevent production of copies of film in compressed numerical forms of the DivX or VCD type, which are one of the principal supports of pirated films available on the Internet.

WO 97/46012 discloses marking audiovisual streams based on small spatial distortions of the pixels of the video images according to selected deformation motifs. That type of marking is invisible to the eye and permits the transmission of information in the video stream without the knowledge of the person that uses it. The information permits identification of the source and date of an unauthorized copy of the video image. That type of modification is also envisaged to resist a change of support of the video, in particular, with a support on a VHS cassette, or change of format in DivX or VCD.

U.S. Pat. No. 4,528,588 discloses transmission of an encoded audiovisual signal, for example, by systems of known keys, wherein the aforementioned signal is decoded on the destination equipment and at the same time marked by identification information specific to the client equipment or its possessor. The aforementioned information is being introduced in such a way, spatially and frequentially, that its extraction is made difficult. The aforementioned information moreover being more obligatorily inserted in the stream thanks to a system implying a magnetic or chip card which contains at the same time the numerical keys necessary to decoding of the aforementioned signal and information of identification to be inserted.

The call for the decoding keys cannot be done without using identification information. The mark inserted in the stream is a binary word inserted with a system of modifications of the levels of the video signal at certain quite precise places, known to a specific device that is in charge of locating the aforementioned mark in a video stream. The mark is more invisible to complicate the task of a mal-intentioned individual who wishes to extract it. Any copy of a film thus protected, in whatever form it may be, contains the same mark as the copy of the signal from which it resulted. Thus, if a copy of a signal is identified as pirated, one can identify the person and the equipment at the origin of the fraudulent copy and, thus, condemn it. The correspondence between a mark and the individual holder of the copy is realized thanks to a data base, contained on a server contacted at the time of the renting of the video.

However, these solutions all have in common that they require the comparison between the copy of origin of a film and the copy pirated to be able to identify the mark inserted in the signal. This implies a centralization of the tests of identification in a place where the original, or the distribution of a great number of copies of the original, would be stored. In those cases, that poses practical problems and the identification of the source of a copy can, thus, become laborious.

Moreover, those solutions necessitate specific hardware and, as a consequence, specialists to carry out the identification. Indeed, many efforts are made to make the inserted mark as discrete as possible to prevent pirates from locating it and, thus, extracting it. However, the more difficult it is for a pirate to locate the mark, the more it requires complex hardware on the verification side. This is because the pirate would otherwise be able to constitute his own apparatus and thus counter the protection system. In such cases, this poses practical problems and makes identification of the source of a pirated copy laborious to obtain.

Lastly, those solutions hardly dissuade pirates from proceeding to make copies. Indeed, the inserted marks being invisible, pirates believe that they can succeed by handling the original video via changes in supports or operations. The pirate is all the more inclined to do it because the pirate knows that very few pirated copies will be tested and identified because the associated methods of identification are very difficult. Thus, even if the mark resists such manipulation, the pirate risks almost nothing in any case. With the current limitations of the current systems, many individuals do not hesitate to pirate and distribute fraudulent film copies.

It would therefore be advantageous to provide a protected system to dissuade pirates from making fraudulent copies and especially dissuade pirates from dispersing pirated works to other people.

SUMMARY

This disclosure relates to a process for distributing a video stream to a multitude of destinations including marking by adding to the video stream at least a visual element such that the marking is applied to an original video stream common to selected recipients, and personalized for a least portion of the recipients by addition of a visual element specific to destination equipment.

This disclosure also relates to an apparatus for distributing a video stream marked according to the process for distributing a video stream to a multitude of destinations, including a standard decoding module of a format of the video stream, and a composition module that interprets the markup data and includes the visual element in the video stream.

This disclosure further relates to a system for fabricating a marked stream according to the process for distributing a video stream to a multitude of destinations, including equipment for distributing a video stream including a standard decoding module of a format of the video stream, and a composition module that interprets the markup data and includes the visual element in the video stream, a storage device, a markup data storage device, a display device of the video stream and a storage device of the modified video stream.

BRIEF DESCRIPTION OF THE DRAWINGS

The present disclosure will be better understood upon reading the description of the, not limiting, realization examples that follow, while referring to the attached drawings where.

DETAILED DESCRIPTION

Figure 1:
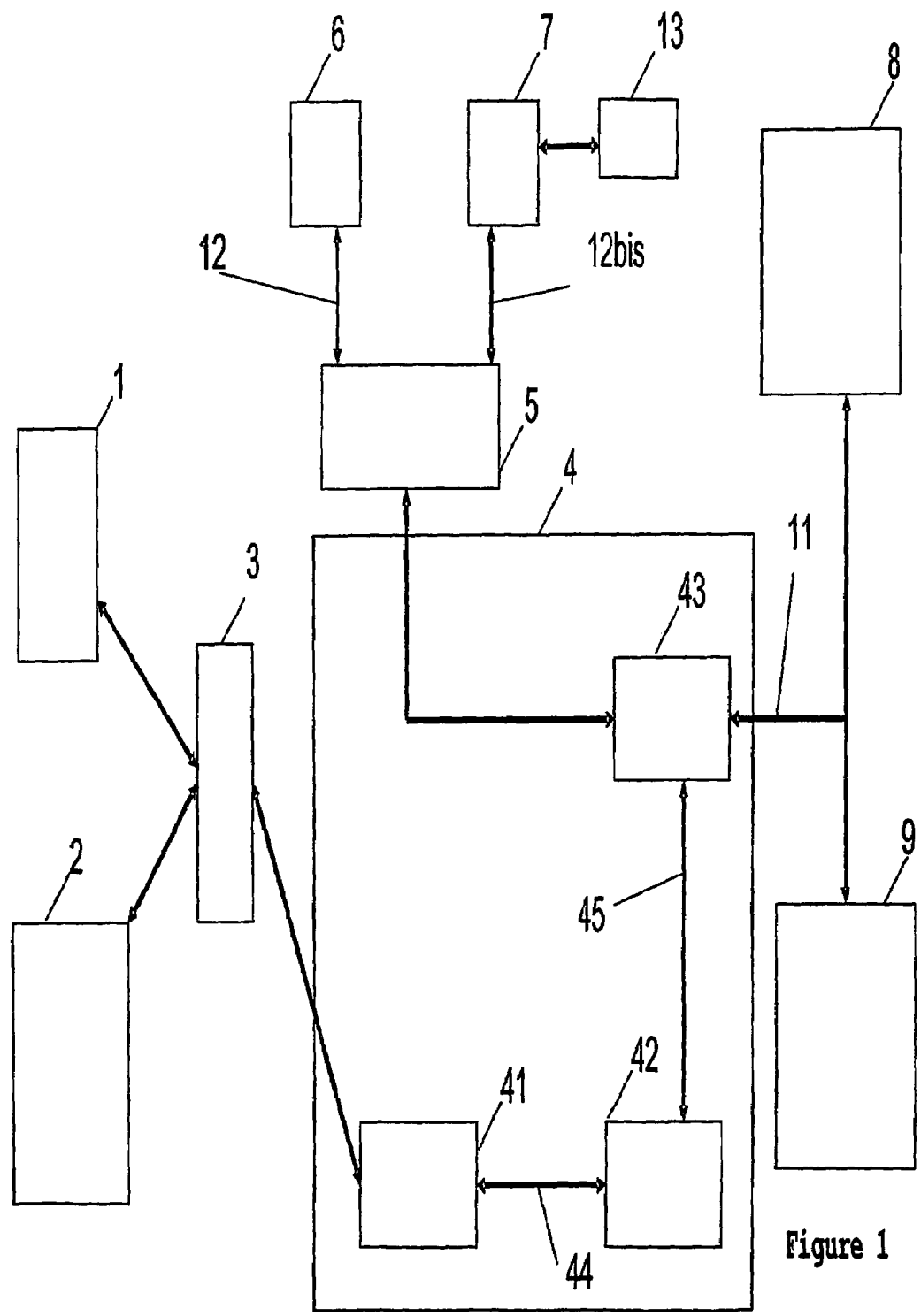
FIG. 1 schematically shows the architecture of a unit of a system for implementing a procedure.

This disclosure concerns a process of distributing video streams to a plurality of recipients, comprising a stage of marking comprising adding to the aforementioned video stream at least a visual element characterized in that the aforementioned stage of marking is applied to an original video stream common to all recipients, and is personalized for at least a part of the recipients by adding a visual element specific to the destination client equipment.

According to one mode of realization, the aforementioned visual element is generated in two stages, a first stage comprising processing the marking data in whatever format to generate marking objects describing the visual element to display, and a second stage comprising adding the aforementioned visual element to the aforementioned video stream.

Moreover, the stage of addition of the aforementioned visual element is accompanied by a stage of invisible modifications.

In another aspect, at least one of the aforementioned stages of addition is carried out before the decoding of video stream in the destination equipment. In another aspect, at least one of the aforementioned stages of addition is carried out after decoding the video stream in the destination equipment.

Advantageously, the aforementioned invisible modifications are characteristic of a digital signature, the aforementioned digital signature being detectable by an algorithm appropriate to detection applied to the stream containing the aforementioned invisible modifications. Preferably, the aforementioned digital signature is obtained from the markup data.

Advantageously, the markup data are different and personalized for every client. In the same way, the aforementioned visual element introduced in the aforementioned video stream may be different and personalized for every client.

The aforementioned visual element may also be an identifier of the client that is visible at the time of the display of the marked video stream. Alternatively, the visual element includes a message destined for the client.

Advantageously, the stage of generation of the markup objects the markup data makes it possible to vary the position on the screen, the color, spacing, the geometry, and the presence of the aforementioned visual element, during the display of all or part of the aforementioned video stream.

The stage of adding the aforementioned visual element to the aforementioned video stream may be carried out on the multi-media server equipment from which the aforementioned video stream is dispatched to the client in a later phase. The stage of adding the aforementioned visual element to the aforementioned video stream may also be carried out on the client equipment.

The markup data may come from a server that protects the audiovisual rights at the time of visualization of the aforementioned video stream. Also, the markup data may come from a module present on the client equipment.

Advantageously, visualization of the aforementioned video stream is conditioned by connecting to the aforementioned server that protects the audiovisual rights and a server is connected to a data base of client profiles including the markup data associated with each client.

The disclosure also concerns equipment for distributing a marked video stream comprising a module of standard decoding of the format of the aforementioned video stream and a module of composition in charge of interpreting the markup data and including the aforementioned visual element in the aforementioned video stream.

Advantageously, the aforementioned equipment comprises a chip card reader connected to a chip card that contains the aforementioned markup data.

This disclosure further concerns a system for fabricating a marked stream comprising equipment for distributing a video stream, a means, linked to the aforementioned equipment, to store the aforementioned video stream, a means, linked to the aforementioned equipment, to store the aforementioned markup data, a display device of the aforementioned video stream and a device to store the modified video stream.

One general principle of a process to secure a video stream is presented hereafter.

The general idea is to introduce a visual marking in the video stream with the aid of new data called "markup data," information or messages, personalized and targeted as a function of every user, the user's rights, the application and the use that made of the audiovisual flux.

With prior solutions, it is possible to transmit films and audiovisual programs in digital form via broadcasting networks of type wireless, cable, satellite or the like or via telecommunication networks of the DSL (Digital Subscriber Line) or LLR (Local Loop Radio) type, via DAB networks (Digital Audio Broadcasting) or via digital communication networks (GSM, GPRS, UMTS) or the like. In addition, to avoid pirating of works broadcast, these last are often encrypted by various well-known means. In a general sense, the systems offering the audiovisual services are based on the principle of a client-server system, whose nodes are connected by a telecommunications network. The client addresses the server through a user interface to request audiovisual content, or audiovisual content that is already at the user. The server, as a function of the rights of the user, sends the audiovisual content and/or the decoding key(s) to the client. Once the film is decoded at the client, it is visualized and can be easily copied and sent to other users, without the possibility of control, follow-up, traceability or verification.

The aforementioned "watermarking" depends advantageously on the terminals on which the video program is played or streamed. The disadvantage of those solutions is that one cannot surprise the people who look at a pirated film without having to apply a suitable tool for detecting watermarking. This has as the consequence that only a team of specialists, equipped with adapted tools, is able to prove the culpability of a pirate by showing that the pirate had a private copy of a video program which the pirate duplicated and distributed.

We introduce into the video stream a visible element, which is hereinafter referred to as a "visual element" and is directly comprehensible to any human being, of the type text, image, or video object, in a personalized way, for each user, each terminal and each viewing session, to be able to determine immediately if the user has rights to the films viewed by a simple identity check, and to also prevent the user from distributing the film without authorization to other people.

Several alternatives of this process of insertion of visual and personalized elements in a digital video stream may be employed.

A first alternative is the insertion of a visual element during the reading and display of a digital film which is or is not encrypted. The composition module, in charge of the insertion of the visual element, integrated in the digital video decoder, on the request for reading and display on behalf of the client, automatically introduces a visual element into the digital stream. This visual element can be of various types: an image, a logo, a text, a video or the like. The visual element is either fixed on a given location of the screen, or moving on the screen during the film. Advantageously, its form, its type, and its appearance change. Its presence on the screen is either permanent or episodic. Advantageously, the visual element creates a direct link with the user, by displaying for example name, telephone number or address. The aforementioned element, in this case being generated thanks to the processing of markup data from the hard disk or the memory dedicated to the software for the display of the stream and/or a chip card inserted in the client equipment. The markup data are binary data describing the content of the element to be displayed such as, for example, the name of the client, address or telephone number, or even an image or a video containing the same information cited previously. These markup data are advantageously encrypted.

Another variation is where the aforementioned markup data are obtained by the client equipment from a server that protects audiovisual rights. Therefore, when the client connects to the server that protects the audiovisual rights at the desired moment to watch the video program which is in the client's possession, the aforementioned server sends markup data to the client which will be treated and interpreted by the composition module of the client equipment, which will result in the display of a visual element, specific to the client, on a display screen.

In another aspect, the box "Set-Top-Box" (STB), serving as an interface device between the display device of the client and the multi-media server, which contains the video program that the aforementioned client wishes to watch, contains a composition module. After the command and the downloading of video film from the multi-media server, the STB containing the profile of the client (identity, rights, practices) inserts a visual element during reading and display of the film. In the case that the STB does not have the profile of the client, it will seek the markup data in a data base of the server concerning the downloaded film and the profile of the client, and decides to engrave the visual element.

Another aspect is the integration of the composition module in the multi-media server. The client connects to a multi-media server and orders a film, the server sends an encrypted film in a personalized way that contains a specific personalized visual element and asks the client, for example, to pay for the rights to view the film. When the client rights are in order, the watched film contains a visual and personalized element that is specific to the client and identifies the client.

Another aspect is where the client equipment connects to a server that protects the audiovisual rights containing information necessary for viewing the film such as, for example, the keys necessary for its decoding. The aforementioned server sends personalized numerical information containing the key necessary for decoding and the markup data relating to the client, which allows the reconstruction of the film on which a visual element of identification, specific to the client, is affixed.

Yet another aspect concerns a process for distributing digital video sequences according to a nominal stream format consisting of a succession of frames, each including at least one numerical block gathering a certain number of coefficients corresponding to simple video elements encoded numerically according to a mode specified inside the concerned stream and used by all the video decoders that are able to decode it to be able to display it correctly. This procedure includes:

a preparatory stage comprising modifying, at least, one of the aforementioned elements (for example the coefficients); and a transmission stage:
of a principal stream conforming to a nominal format, including the plans containing the blocks that are modified during the preparatory stage and
through a channel separate from that of the aforementioned complementary numerical information that allows reconstruction of the original stream through a calculation on the destination equipment, as a function of the aforementioned principal stream and the aforementioned complementary information. The aforementioned "complementary information" is defined as a collection comprising data (for example, the coefficients describing the original numerical stream or extracts of the original stream) and functions (for example, the substitution or permutation function). One function is defined to contain at least one instruction that matches up the data and the operators. The aforementioned complementary information describes operations that must be executed to recover the original stream from the aforementioned modified stream.

Reconstruction of the original stream takes place on the destination equipment (the STB) from the modified principal stream that is already present on the destination equipment and from the, in real time dispatched, complementary information that comprises data and functions executed with the aid of numerical routines (collections of instructions). The complementary information contains, moreover, the markup data and numerical routines relating to the visual elements that have to be inserted in the film. The insertion of visual elements takes place in real time during descrambling of the film in the STB and during its display on the screen.

In another aspect, the complementary information that is sent to the destination equipment by the server does not contain the data and functions that allow display of the original stream at places and moments corresponding to the display of a visual element. For example, if a visual element is displayed in the central part of the image, the complementary information that is sent to the destination equipment will not contain the data and functions which would have allowed a display identical to that of the original stream for the aforementioned party. In place of the aforementioned data and functions, the markup data will be transmitted, which will have an effect on the display of the visual element on the client equipment.

Different representations of the visual elements are realized. For example, one replaces at the beginning of the film a portion of the original film with a video sequence that presents the name and the address of the user. One also uses tools of the "picture in picture" or techniques of overlay of images, to insert an image containing a message or an identifier of the client equipment in the video, or other tools already existing in the numerical decoders present on the market for the insertion of text in the video films, techniques well-known to the expert. The displayed portions of text have changing colors, as well as the background of the font. They appear for certain ones on only one image and for others on a whole series of images. The spacing between the letters constituting the message is variable. The fonts of characters used change. The content of the messages consists of messages of identification of the client such as name, address or client or telephone number and information intended for the client, like messages with legal consequences informing the client of rights and obligations in relation to the copy of the film, of the type "Mr. Untel, this film can be seen only by you and your family and in no case can a copy and commercial distribution be made."

In another example, the visual elements contain messages intended for the client of the type email, short message (SMS or "Short Message Service"), or messages sent by the server that protects the audiovisual rights.

Advantageously, one can display visual elements by modifying the blocks constituting the structured binary stream in the case of a MPEG-2 stream, for example.

Advantageously, in a stream of the type MPEG-4, one can carry out visible markup while inserting the markup data thanks to one or more additional multi-media tracks in the numerical binary stream. This additional video stream can then contain only visual elements which appear on video streams already present. Standard MPEG-4 also allows, thanks to the management of scenes, to change the position of display and the animation of this new video track containing the visual elements.

One interest of this solution is that it allows a fast and simple authentication of the client for whom a copy of a video program is intended. The aforementioned authentication is always possible for the possible numerical or analog copies of the aforementioned program. Therefore, a person found in possession of a copy of the aforementioned program, whatever the backup is: analog or numerical, must have a copy that the visual element personally identifies. If the visual element present on the aforementioned copy does not identify its current holder, then it is the case that the aforementioned copy is fraudulent: its holder does not have the rights associated with the holder's consumption, and the identified person by the visual element distributed, voluntarily or not, a copy of the aforementioned program for which the holder does not have the rights of distribution. Therefore, identification of the author of a pirate copy of a film is largely facilitated compared to other solutions available. On the one hand, it no longer requires a comparison between the copy to be tested and the original since the visual element is visible and directly comprehensible. On the other hand, it does not require a complex device since simple viewing is enough to identify the person at the origin of a copy.

We provide a procedure for the suitable and personalized visible marking of video films to dissuade illicit copies and that applies to every structured numerical video content, with any system built on the client-server principle described, as with any system of distribution of DVDs and CDs disks. An example is the addition of visible marking in the "screeners." The "screeners" are VHS or DVD copied films ready to be, distributed in the movie theaters and which are addressed to professionals of the cinema (critics, distributors) in certain countries such as in the United States. They need to have aversion of films in advance to be able to make their criticism, to evaluate the interest of a film before its release. The "screeners" are thus essential to the operation of the cinematographic studios. However, they are one of the main sources of pirated films not yet released on DVD (the pirating related to the "screeners" affects films right before or right after their release in the movie theaters).

By applying our procedures based on an analysis of the video stream and separate transmission of a modified principal stream and additional information containing the markup data, on the "screeners" DVD, their recipients will no longer be able to make numerical copies and distribute them. For example, for each of the "screeners" recipients, one introduces into the film the name and address in a visible way, if the person distributes the film, the name will appear clearly at all the places where the recipient will distribute the film, which will reveal the source of unauthorized duplication. In this manner, one carries out a visible and personalized marking, different from the traditional watermarking which is, with the naked eye, invisible. A simple example is the overlay of the name of the person or the company for which the "screener" is intended on the video displayed, so that it is displayed permanently on the screen. Thanks to this personalized marking, if an analog video is encoded to be distributed on the Internet in an illicit. manner, it will carry the signature of the person from which the pirated copy originated. Until now it was very simple and not very risky to make a copy of its "screener." This explains the success of this form of pirating.

The visual elements introduced into video stream remain present in the stream even if the latter undergoes various modifications and numerical transformations such as decompression, analog-digital transformation, numerical change of format, distortion, re-compression, assembly, rotation, and geometrical handling of the image, provided that they leave the video comprehensible. The reason is that these modifications attempt to avoid deteriorating the contents of the images of the video so that it remains comprehensible. Therefore, since the visual element is voluntarily displayed and comprehensible, it will also remain so after one of these processing procedures.

The technology described herein is complementary to other protection and traceability technologies, such as watermarking, which can be introduced into the digital video stream starting from the markup data which in this case allows the display of a visible mark and an invisible mark. We indeed make it possible to add, in addition to a visible marking, invisible modifications in the stream according to methods of "watermarking" (embossing or tattooing), and/or of "fingerprint" (a technique used to distinguish various copies of the same contents following its recipient by comparing the watermark inserted in the video with those backed up beforehand in a data base of associated data), and/or of stéganographie (a technique allowing to dissimulate information within contents of the type text, video, or image), on distributed video streams.

Others have already thought of using this personalized watermarking within the framework of the protection of digital films by encoding a version of the film for each user, unless these solutions are not commercially viable. We circumvent the problem of compressing the film for each client since all who receive the same compressed film, only the markup data sent differs from one client to another and is personalized for each client. Thanks to this disclosure, studios can freely use the "screeners" to promote their films and counter the main source of illicit copies of high quality films.

An example is the introduction of the name and address of the person for whom the film is intended and which should not distribute it by replacing parts of image of origin by a new image in conformity with the format of the video and containing the coordinates of the client. For example, the case of MPEG-2 streams is interesting because the films in DVD or DVB format are the result of it. A numerical MPEG-2 video stream consists of sequences of images (plans or frames), gathered in groups of images "Groups Of Pictures" (GOPs). An image can be of type I (Intra), P (Predicted), or B (Bidirectional). Images I are the images of reference, they are entirely encoded and are, thus, of large size and do not contain information concerning the movement. The frames P are plans predicted starting from the preceding plans I and/or P, thanks to vectors of movement in only one direction, called from now on "forward." The plans B are known as bidirectional, they are related to the plans I and/or P preceded or followed by movement vectors in the two temporal directions ("forward" and "backward"). The movement vectors represent two-dimensional vectors used for the compensation of the movement. They provide the difference in coordinates between a part of the current image and a part of the reference image.

An image can be organized by "slices" or sections, for example, as in MPEG-2. An image or a frame consists of macro blocks that themselves consist of blocks. A manner of introducing complementary modification information is to encode the name and address of the user in a number of blocks, macro blocks, or "slices" with the same format as the original stream, in fact, MPEG-2, to replace the original macro blocks with the macro blocks built for the modification in each image.

Another possibility is to superimpose the complementary information introduced in the existing macro blocks. This substitution or this superposition is carried out thanks to the complementary information sent by the server to the client and which contains data and functions to be carried out on the modified principal stream to obtain the original marked stream. Thus, for the parts of the image that do not have to bear an identification mark in the form of a visual element, the complementary information specifies to the client equipment which function to apply to principal stream to obtain the original stream. For the parts of the image that do have to support the affixing of a visual element, complementary information specifies to the client equipment that it replace the corresponding structures ("slices," macro blocks and blocks) of the modified principal stream by the structures conveyed by the markup data, contained in complementary information, which corresponds to an image containing the message (text or other) to display on the client equipment to identify the associated client.

The disclosure will be better understood upon reading an example of the disclosure, while referring to FIG. 1.

In the example, the disclosure concerns a video sequence encoded according to the MPEG-2 format, without that it constitutes a reduction of the range of the disclosure.

The encrypted digital video contents are contained on DVD (1) and encoding used is based on a technique, based on well known keys. The contents of the DVD (1) are sent to a numerical decoder of the client (4) also called "Set Top Box" (4) via a video acquisition interface (3). The video contents of the DVD (1) are then transferred within the Set Signal Box (4) to a decoding module (41). The module of decoding (41) deciphers the contents of the DVD (1) and sends the decoded video in MPEG-2 format (44) to the decoding module of decoding MPEG-2 (42) of the Set Top Box (4). The MPEG-2 decoding module decodes the deciphered video (44) and transmits the video that is ready for display (45) to the marking module differently called "composition module" (43) of the Set-Top-Box (4). Composition module (43) is used to affix a visual element of personal identification to the video stream (45) transmitted by decoder MPEG-2 (42) according to the markup data (12) read through an interface of acquisition of the markup data (5). The markup data (12) are read from a chip card (6). The video contents, ready and marked in a personalized and visible way (11), are then displayed on the display device, of type television or monitor (8), of the client. If the client wants to record the marked video stream (11) on a storage device (9) of the type hard disk, DVD, CD, or VHS cassette, the recorded content will contain the visual element of personal identification affixed by the composition module (43) and is thus not commercializable.

In another example, the encrypted digital video contents are received from a satellite or parabolic (2) reception device and forwarded towards the Set-Signal-Box (4) via a video acquisition device (3).

In another example, the markup data (12 bis) are received by the acquisition interface of the markup data (5) from a remote server (7).

In a variation of the example, the remote server (7) is a server that protects the audiovisual rights and is connected to a server of electronic mail (13) like an email server or a text server (SMS or "Short Message Service") or a server used for the follow-up of the customers renting of the protected video. This electronic mail server (13) occasionally sends to the server (7) protecting the audiovisual rights at least a message intended for the client to which the decoder (4) belongs. This message is then included in the markup data (12 bis) so that the aforementioned message can be displayed on the screen (8) of the client.

Figure 2:
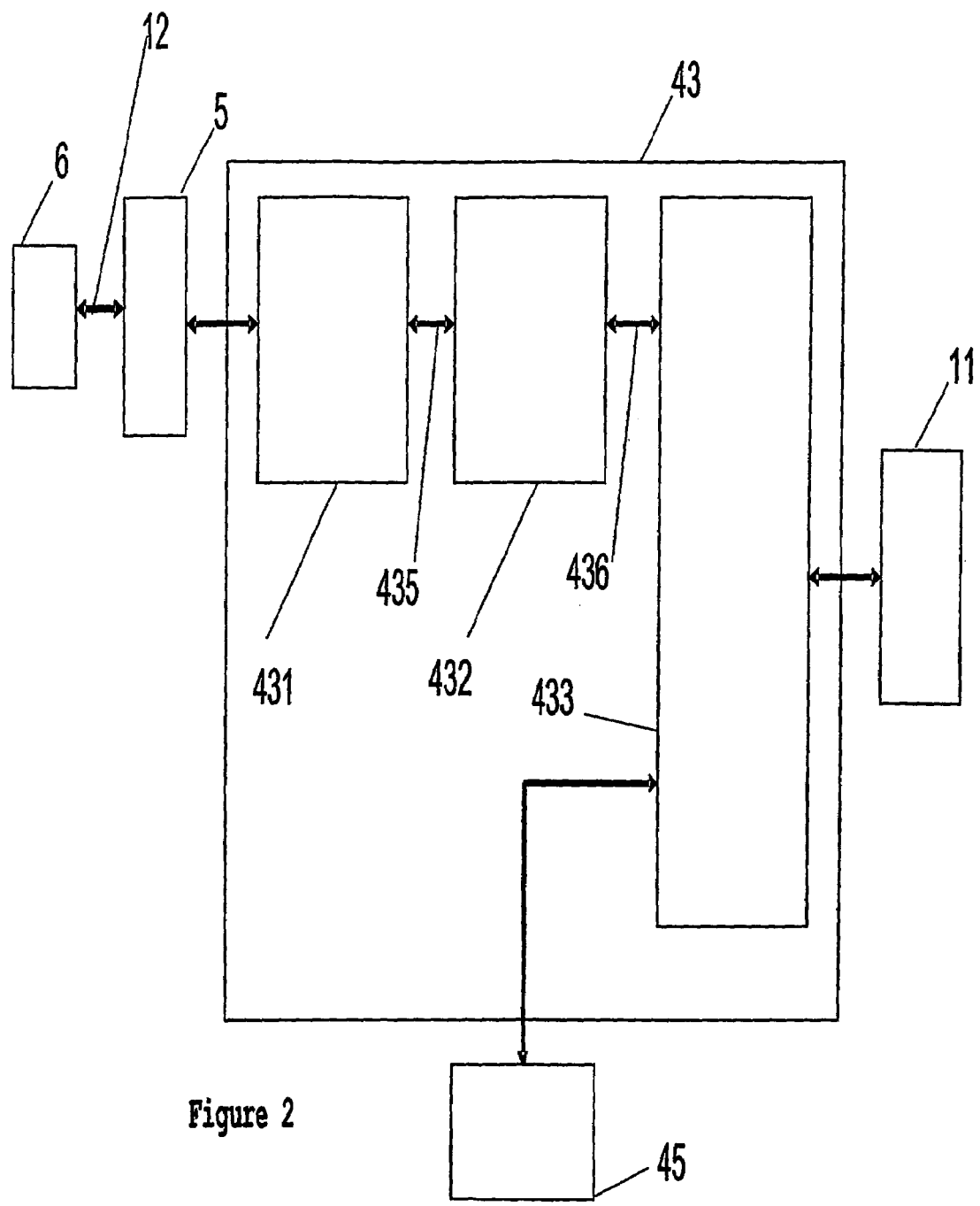
FIG. 2 schematically shows the architecture of a sub unit of a system for setting in motion a procedure.

The operation of the composition module (43) will be better understood upon the reading of the following realization example, exhibited in the drawings of FIG. 2.

The markup data (12) coming from the chip card (6) are read by an interface of the type chip card reader (5) and sent to an interpretation module of the markup data (431). This interpretation module (431) is a part of the composition module (43). The purpose of the module of interpretation (431) is to transform the binary data of the markup data (12) into markup information (435). Therefore, in the example of interest, the interpretation module (431) transforms the markup data (12) into a string of characters that contain an identifier of the client (435), as, for example, name. This character string is sent to the module that determines the form of the visual element (432) which decides to introduce the aforementioned string (435) at a random location in the marked video (11) to generate markup objects (436) likely to be displayed on a screen. The module that determines the form (432) also determines the color, character font, size, and duration of appearance of the character string (435) on the screen. Once all of the characteristics of the display of the visual element (436) contain the character string (435) defined in a manner to generate markup objects (436), the visual elements (436) are transferred to a module that overlays the objects in the video (433). The module that overlays the objects (433) adds the visual element (436) to the video (45) to obtain a video marked in a personalized way (11) in which the character string (435) is embedded.

In another example, interpretation module of the markup data (431) extracts the markup data (12) from an image (435). The image (435) contains an identifier of the client such as name and address written in a colored framework. The image (435) is transmitted to the module that determines the form (432) and which decides in a random way the position of the image (435) on the video marked (11) to generate a markup object (436). The module that embeds the object in the video (433) then processes the video (45) to affix to it the element of personalization (436) to make a marked video (11).

In another example, the interpretation module of the markup data (431) generates, in addition and within the markup information (436), a digital signature (435) starting from the markup data (12). Digital signature (435) is an identifier of the client and/or viewing session and/or client device and/or a message. The signature is transmitted to the module that determines the form (432) that will generate a motif for watermarking (436), invisible to the human visual system and characteristic of the aforementioned signature (435) so that the inverse operation of the recovery of the signature from the watermarking motif is possible, possibly by using the contents of the data base of client profiles (702). The motif for invisible watermarking (436) is overlaid in the video (45) by the overlay module (433) after its decoding by the MPEG decoding module (42), via a series of invisible modifications within the video (45) after decoding. Generation of a watermark (436) invisible to the human visual system starting from the digital signature (435) is carried out according to techniques of "watermarking," of "fingerprint" (watermarking identifying the recipient of a video stream) or of traditional stéganographie.

A non restrictive example is as follows: the numerical signature is encrypted according to a traditional encrypting technique, and the numerical string thus obtained is repeated to generate a frame of samples of pseudo random noise of which the number of samples is equal to the number of pixels of each image of the video be to watermarked (45). Each bit of this pseudo random noise is then assigned to a pixel which can have the value 0 or 1. The pixels thus obtained are arranged in a manner to form columns and rows. This technique leads to obtaining a binary image (436) consisting of pixels of value 0 or 1. The "0" and the "1" that constitute this image are then added to the LSB (least significant bit) of each pixel of each image of the video (45) by the overlay module (433), thus introducing modifications invisible to a human eye and characteristic of the digital signature (435) into the video (45). It is then possible to detect and recover the digital signature at a later stage by carrying out a comparison between the original video stream and the reconstituted and marked video stream (11). In the case that the original LSB and the recomposed LSB are different, the detected bit is "1," in the opposite case, its value is "0."

Another example comprises modifying pixels only at certain points in video stream (45), the aforementioned points being determined with the aid of the exploitation of a numerical key stored in the client profiles database server (702). The aforementioned modification comprises reversing the LSB when the bit to be coded is "1," and leaving it unchanged if its value is "0." Still, a pseudo random noise is obtained by encoding the signature in a way to be inserted in the video (45). A dedicated numerical key is then used to calculate the positions of the modified pixels and stored on the client profiles database server (702) to be able to detect and recompose the message encoded at a later phase of detection and recovery of the numerical key. During this last phase, the detection module determines positions of the modified pixels with the aid of the dedicated numerical key obtained from the client profiles database server (702) and then compares the value of the pixels of the original video stream with those of the video stream to test at each of these points.

More generally, techniques used within the framework of "watermarking" technologies, "fingerprinting" and stéganographie, are used for:

determining the points or zones of the image of the video (45) to modify for inserting the signature;

formatting the binary frame to insert in the video, generated from the numerical signature (435), including, in particular, but not exclusively, possible error codes of redundancy and encrypting; and modifying video stream (45) to integrate the watermarking motif (436).

Figure 3:
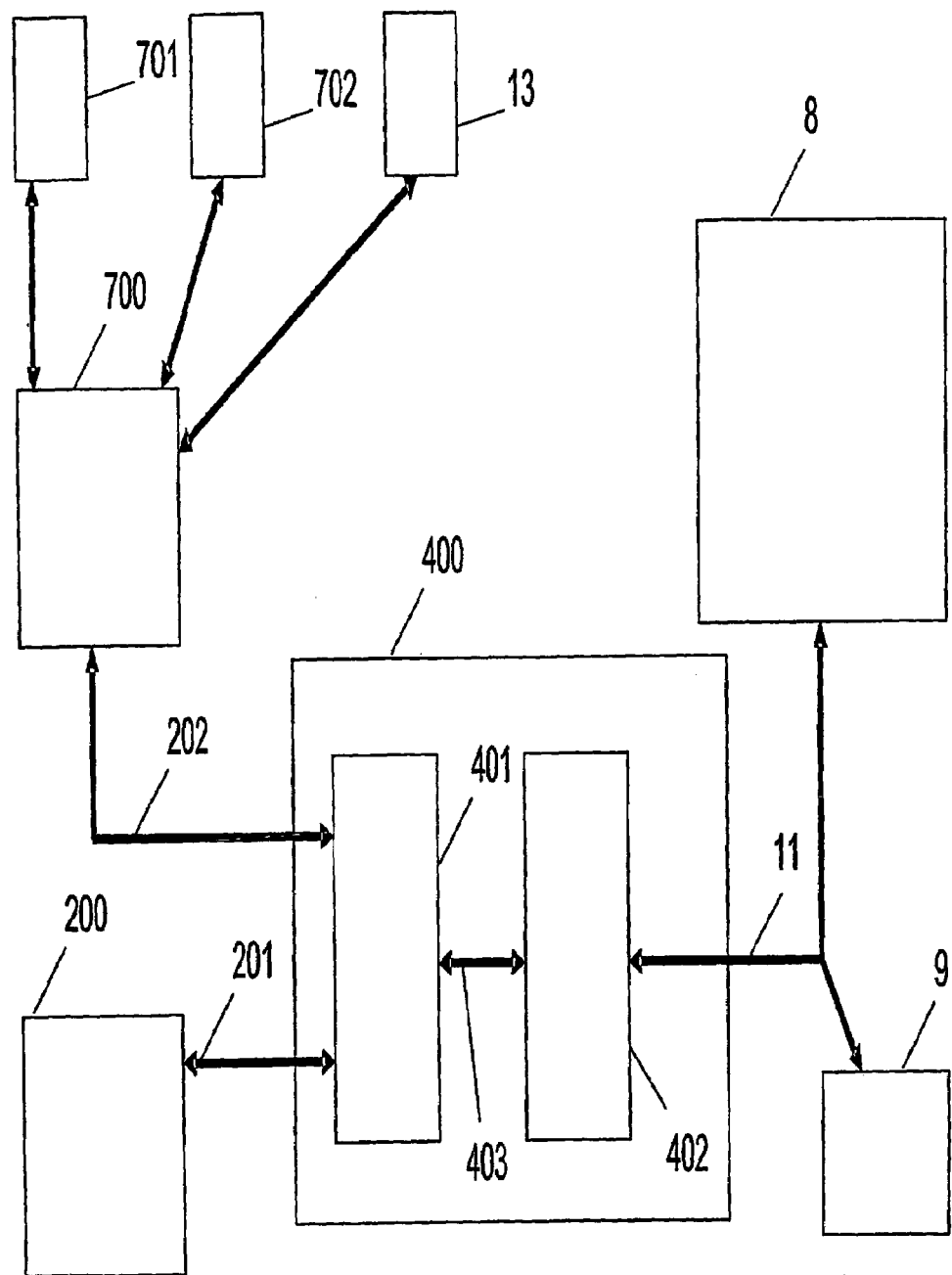
FIG. 3 represents a particular mode of realization of a flux synthesis system.

We can combine affixing a visual element to the video stream with a secured stream distribution system. One example is described below in reference to FIG. 3. In that example, the video is scrambled by a system that concerns a nominal stream format comprising a succession of frames comprising at least one numerical block gathering a selected number of coefficients corresponding to simple video elements encoded numerically according to a mode specified inside the concerned stream and used by all the video decoders that are able to decode it to be able to display it correctly. This procedure comprises: a preparatory stage that comprises modifying at least one of the aforementioned elements (for example, the coefficients) of the original stream; a transmission stage:

of a principal stream conforming to a nominal format (201), comprising the plans containing the elements that are modified during the preparatory stage from a video server (200) and through a channel separate from that of the aforementioned principal stream (201) of complementary numerical information (202) that allows reconstruction of the original stream from a calculation on the destination equipment (400) as a function of the aforementioned principal stream (201) and the complementary information (202). "Complementary information" (202) is defined as a collection comprising data (for example, of the coefficients describing the original numerical stream or extracts of the original stream) and functions (for example, the substitution or permutation function). One function is defined to contain at least an instruction that matches up the data and the operators. The complementary information (202) describes the operations to execute to recover the original, stream from the aforementioned modified stream.

In this example, the complementary numerical information (202) contains in addition to the data and functions necessary for the reconstitution of the nominal stream, the data and functions carried out with the aid of numerical routines (collections of instructions) devoted to add a visual element to the reconstituted video (11).

In this example, the "Set-Top-Box" (400) is located at the client. Reconstruction of the original marked stream (11) takes place on the destination equipment (the STB) (400) from the modified principal stream (201) and the complementary information sent in real time (202). The client equipment (400) includes a binary stream composition device (401) and a decoder (402). The binary stream composition device (401) modifies the modified principal stream (201) in a manner to conform to the functions and data included in the complementary information (202) to: on the one hand, return the modified principal stream (201) comprehensible to a human eye; on the other, add to the reconstituted stream a visual element, the visual element being an identifier of the client or a message that is intended for the client. The binary stream thus generated (403) is transferred to the decoder (402) which decodes it to generate a marked video (11). The marked video (11) is displayed on the display device of the client (8). If the client or a third party wants to record the marked video stream (11) on a storage device (9) of type hard disk, DVD, CD, or VHS cassette, the recorded contents contain the visual element of personal identification.

The additional information (202) is sent to the equipment by a server that manages the rights of the client (700). This server (700) has access to the original complementary information (701) allowing reconstitution of the unmarked modified principal stream (201) and from a data base of client profiles (702). The server sends permanently the original complementary information (701) and the markup data specific to the client calculated thanks to the client data base (702).

When the client wishes to view the video contents, it addresses a request to the server that manages the rights of the customers (700). This server checks by a standard means (for example, a data base) the rights of the client for the requested video contents and if the client is authorized to view the video contents, the server that manages the rights of the customers (700) sends the complementary numerical information (202) as the reading of the contents on the client equipment proceeds.

In another example, the server (700) decides in real time to send complementary information (202) personalized as a function of the client (400) to whom it is addressed by sending either a part of original complementary information (701) or the markup data specific to the client calculated thanks to the data base of client data (702). Thus, the client does not receive the complementary information (202) that would enable the client to display the nominal stream where an identification mark is present.

In another example, the server (700) decides in real time to send complementary information (202) personalized as a function of the client (400) to which it is addressed by sending either a part of the original complementary information (701) or the markup data specific to the client calculated thanks to the data base customers (702), or a part of the original complementary information (701) modified according to the data base of client data (702). The modifications made to the complementary original information comprise in particular, but not exclusively, adding instructions intended for the module of composition (401) in a manner to force it to reverse the LSB of certain visual coefficients of the stream such as the coefficients. DC, for example. The absence or presence of an inversion of a LSB will allow, at the time of a later stage of recovery of the digital signature of the stream comprising comparing the original video stream with the marked video stream (11) to recompose a bit of the digital signature. More generally, modifications made to the complementary information are used to insert an invisible modification within the reconstituted and marked video stream (11). They thus comprise indicating to the composition module (401) how to insert a digital signature into the digital stream (403) according to any method of "watermarking," "fingerprint," or existing and applicable stéganographie, on a video stream that is still compressed (before decoding: in particular on coefficients in the frequency domain).

In another example, the server (700) which sends complementary information (202) to the decoder of the client (400) connects to an electronic mail server (13) which can be an email server, a text server (or SMS), or an instantaneous electronic mail server (such as for example "IRC"/"Internet Relay Chat"). This electronic mail server (13) relays messages intended for the client that possesses the client equipment (400) for which the complementary information (202) is intended, towards the server that protects the audiovisual rights (700). The audiovisual protection server (700) then inserts these messages within the complementary information (220) so that the aforementioned messages are displayed on the display device (8) of the client for which they are intended.

The invention claimed is:

1. A process for distributing a video stream according to an original video stream conforming to a nominal format comprising a succession of frames, individual ones of the frames including at least one numerical block comprising coefficients corresponding to simple video elements, comprising:
generating a principal stream conforming to the nominal format of the original video stream by modifying at least one of the numerical blocks of the original video stream;
generating complementary information comprising:
data and functions to enable reconstruction of the original video stream, wherein the data comprise portions of the original video stream modified in the principal stream; and
markup data and numerical routines to enable construction of a visual element to display information specific to one or more intended recipients,
wherein the data and functions do not provide for reconstruction of the original video stream at locations of the video stream where the visual element is to be displayed; and
transmitting the principal stream and the complementary information to destination equipment to generate a marked video from the principal stream as a function of the complementary information.

2. The process according to claim 1, wherein the visual element is added to the marked video, wherein adding the visual element is accompanied by adding invisible modifications.

3. The process according to claim 2, wherein addition of at least one visual element is carried out before decoding the video stream in the destination equipment.

4. The process according to claim 2, wherein a addition of at least one visual element is carried out after decoding the video stream in the destination equipment.

5. The process according to claim 2, wherein the invisible modifications are characteristic of a digital signature, the digital signature being detectable by an algorithm appropriate for detection applied to the video stream containing the invisible modifications.

6. The process according to claim 5, wherein the digital signature is obtained from the markup data.

7. The process according to claim 1, wherein the markup data are different and personalized for each client.

8. The process according to claim 7, wherein the visual element introduced in the marked video is different and personalized for each client.

9. The process according to claim 8, wherein the visual element is an identifier of the client during display of the marked video.

10. The process according to claim 8, wherein the visual element includes a message destined for the client.

11. The process according to claim 1, further comprising processing the markup data in any format to generate markup objects that describe the visual element to display, wherein generating markup objects from the markup data enables varied positions on a display screen, color, spacing, geometry, and presence of the visual element, during display of all or a portion of the marked video.

12. The process according to claim 11, wherein adding the visual element to the video stream is carried out on a multimedia server equipment from which the video stream is dispatched to a client in a later phase.

13. The process according to claim 11, wherein adding the visual element to the video stream is carried out on client equipment.

14. The process according to claim 13, wherein the markup data come from a server that protects audiovisual rights when viewing the video stream.

15. The process according to claim 13, wherein the markup data come from a module present on the client equipment.

16. The process according to claim 14, wherein viewing the video stream is conditional upon connection to the server that protects the audiovisual rights.

17. The process according to claim 14, wherein the server connects to a data-base of client profiles including the markup data associated with each client.

18. An apparatus for receiving a marked video stream, comprising:
a standard decoding device to reconstruct an original video stream as a function of a principal stream and complementary information, the principal stream including at least one modified block of the original video stream, and the complimentary information including:
data and functions to enable reconstruction of the original video stream, wherein the data comprise portions of the original video stream modified in the principal stream; and
markup data and numerical routines to enable construction of a visual element to display information specific to one or more intended recipients,
wherein the data and functions do not provide for reconstruction of the original video stream at locations of the video stream where the visual element is to be displayed; and
a composition module to interpret the complementary information and to add the visual element to the reconstructed original video stream to generate a marked video.

19. The apparatus according to claim 18, further comprising a chip card reader linked to a chip card that comprises the complementary information.

20. A system for fabricating a marked video stream, the system comprising:
a server to generate a principal stream including at least one modified block of the original video stream, and to generate complementary information including:
data and functions to enable reconstruction of the original video stream, wherein the data comprise portions of the original video stream modified in the principal stream; and
markup data and numerical routines to enable construction of a visual element to display information specific to one or more intended recipients,
wherein the data and functions do not provide for reconstruction of the original video stream at locations of the video stream where the visual element is to be displayed; and
client equipment including a decoding module to reconstruct the original video stream as a function of the principal stream and the complementary information, a composition module to interpret the complementary information and to include the visual element in the reconstructed video stream, and a display device to display the marked video stream including the visual element.

21. The system of claim 20, further comprising:
at least one storage device to store the complementary information and the modified video stream.

* * * * *

UNITED STATES PATENT AND TRADEMARK OFFICE
CERTIFICATE OF CORRECTION

PATENT NO. : 7,639,833 B2  Page 1 of 1
APPLICATION NO. : 11/165150
DATED : December 29, 2009
INVENTOR(S) : Daniel Lecomte et al.

It is certified that error appears in the above-identified patent and that said Letters Patent is hereby corrected as shown below:

Claim 4, column 15, line 33, please amend "a addition" to read "addition".

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,639,833 B2  Page 1 of 1
APPLICATION NO. : 11/165150
DATED : December 29, 2009
INVENTOR(S) : LeComte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this

Twenty-first Day of December, 2010

David J. Kappos
*Director of the United States Patent and Trademark Office*